3,463,611
SULFUR RECOVERY
Nicholas J. Haritatos, El Cerrito, and Phillip D. Harvey, Walnut Creek, Calif., assignors to Chevron Research Company, San Francisco, Calif., a corporation of Delaware
Filed May 1, 1967, Ser. No. 635,241
Int. Cl. C01b 17/04
U.S. Cl. 23—225
11 Claims

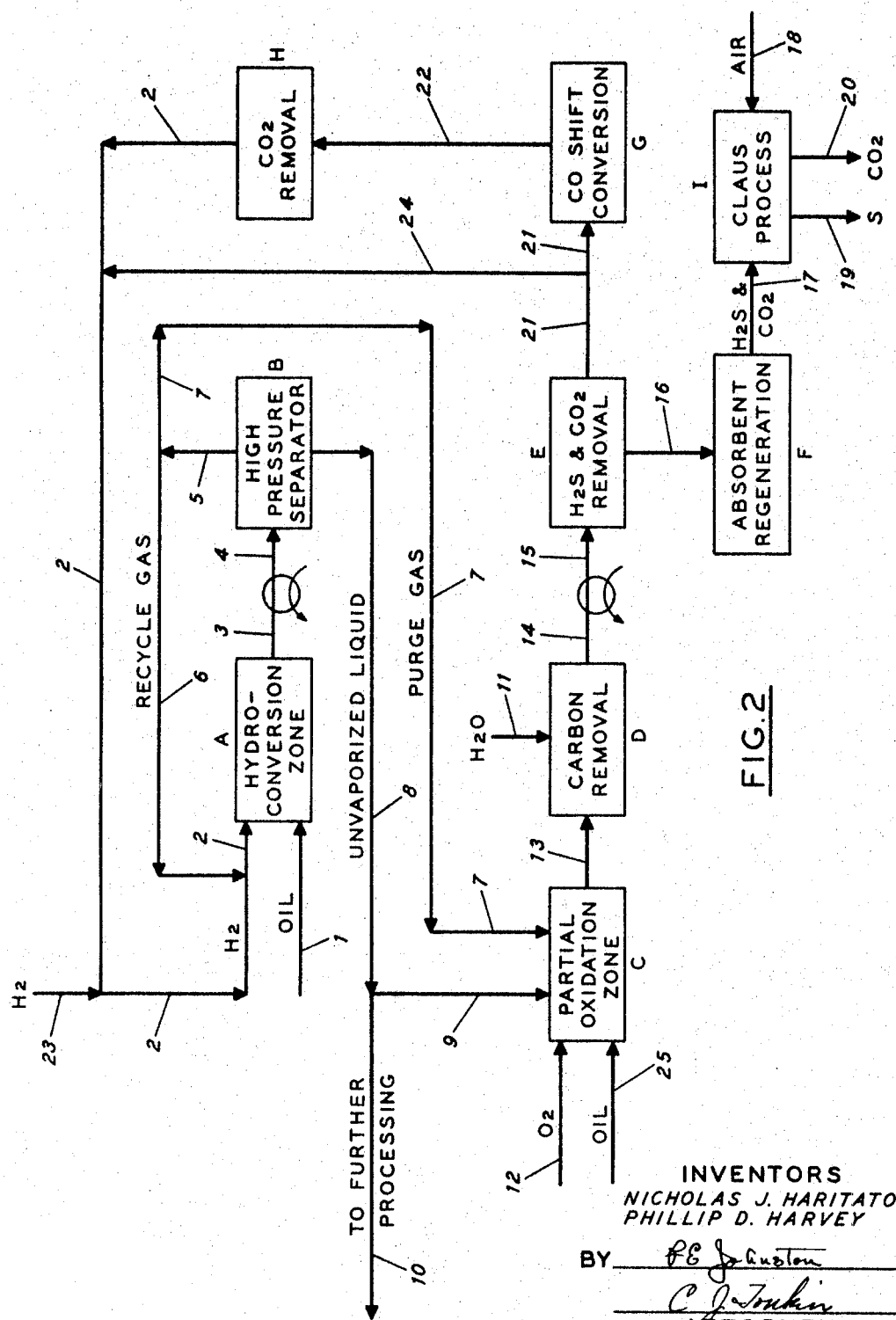

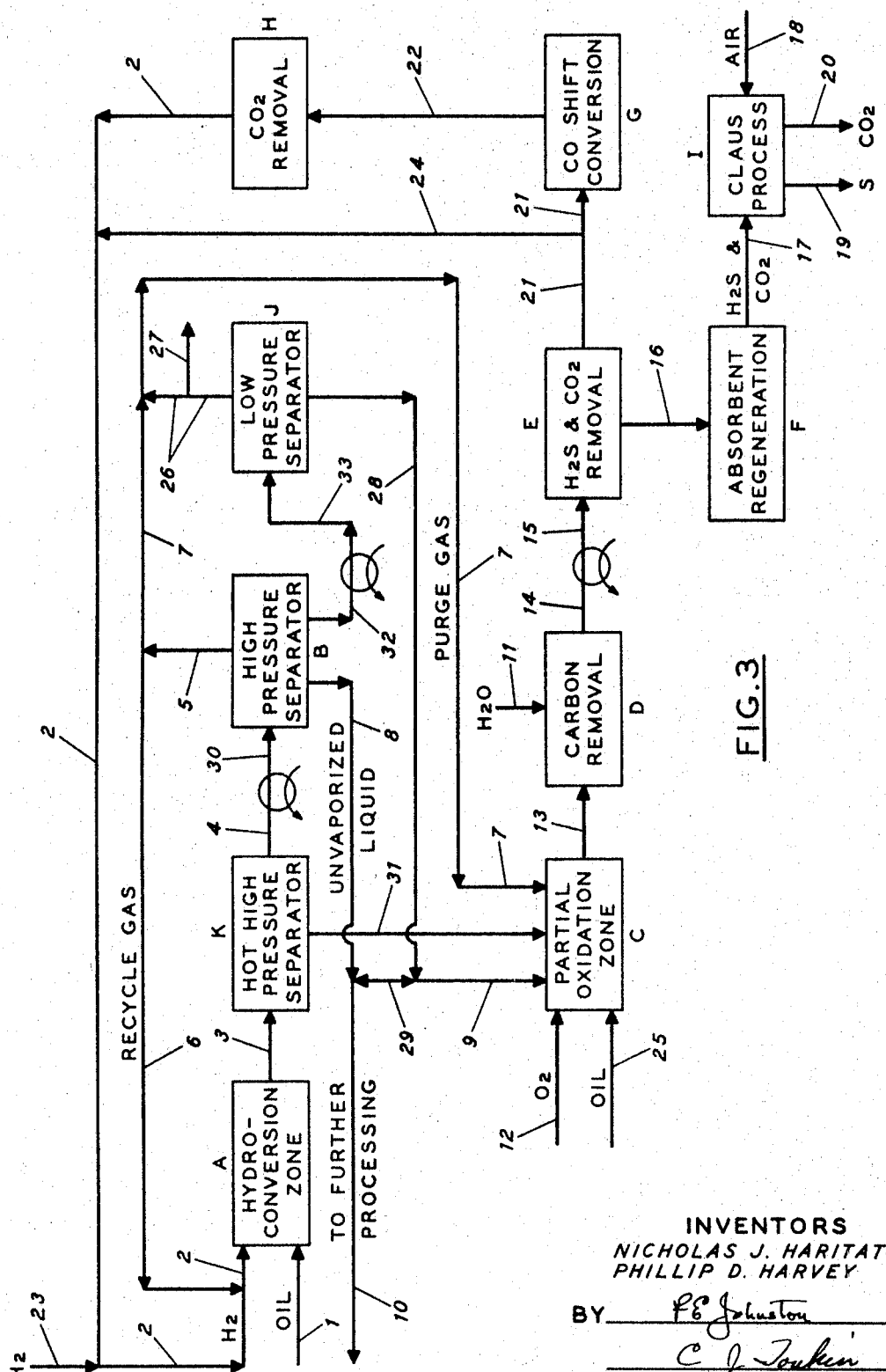

ABSTRACT OF THE DISCLOSURE

A process for producing sulfur by:

(1) withdrawing purge gas from a hydroconversion zone recycle gas stream containing hydrocarbons, hydrogen and hydrogen sulfide;

(2) passing the purge gas to a partial oxidation zone wherein the hydrocarbons in the purge gas and other feed stream to the partial oxidation zone are partially oxidized to form hydrogen, carbon monoxide and carbon dioxide;

(3) passing the effluent from the partial oxidation zone to a hydrogen sulfide and carbon dioxide removal step to separate the hydrogen sulfide and carbon dioxide from hydrogen and carbon monoxide; and (4) passing the separated hydrogen sulfide and carbon dioxide to a Claus process for manufacture of sulfur.

Definitions

The following terms are used in this specification with the meanings given below:

Purge gas: a portion of a larger recycle gas stream.

Hydroconversion: a conversion of hydrocarbons using hydrogen.

BACKGROUND OF THE INVENTION

Field of invention

This invention relates to a process for the recovery of sulfur. More particularly, it concerns the manufacture of sulfur by a Claus process after partial oxidation of hydrocarbons in a hydrogen sulfide containing gas purged from a hydroconversion zone recycle hydrogen rich gas stream.

Description of the prior art

One typical hydroconversion process in which there is a recycle stream containing hydrogen sulfide and hydrocarbons is the hydrocracking process. In general, process flow in hydrocracking consists of first mixing feed with hydrogen and recycle gas. The mixture is heated, then contacted with catalyst in a reactor zone at a specific hydrogen partial pressure. Most of the organic sulfur contained in the feed is converted to hydrogen sulfide. Thus the amount of hydrogen sulfide depends upon the amount of sulfur in the feed. Design may be either a one-stage or two-stage hydrocracking system. In some processes the first step in a two-stage operation is considered to be a pretreatment step or a combination pretreatment and hydrocracking step. Reactor temperatures range from 400° F. to 850° F. and pressures from 500 to 4500 p.s.i. Operating severity and hydrogen consumption depend upon the feedstock and the products desired as well as the process itself and the catalyst employed.

The removal of hydrogen sulfide from gases has recently become of great importance because of several facts: (1) vented hydrogen sulfide is dangerous and pollutes the air; (2) when hydrogen sulfide is burned, it forms sulfur dioxide, which also pollutes the air; (3) the specifications for allowable sulfur content in petroleum hydrocarbons have recently become more rigid; and (4) the deposits of mineral sulfur have become less readily available so that by-product hydrogen sulfide has become valuable. Typically, hydrogen sulfide is removed from hydrocarbon gas streams by absorbing the hydrogen sulfide in a chemical solution, frequently an alkanol amine. The hydrogen sulfide stream generally must be cool before being fed to the absorber. After absorption of the hydrogen sulfide, the remaining hydrocarbons and any other gases are passed to a gas recovery plant. In the gas recovery plant the various hydrocarbons are separated into streams such as hydrogen, butanes and heavier (if any), propane, ethane and methane. The methane is frequently used in a refinery as a fuel or as feed to a steam reforming unit to manufacture hydrogen for use in the refinery. The hydrogen from a steam reforming unit must be recompressed to substantially higher pressure if it is to be used in a high pressure hydroconversion process. Because of the above processing required of the hydrogen sulfide containing gas, it would often be more economical to simply vent the hydrogen sulfide containing gas to the atmosphere, but even this course is not available in most localities because of pollution regulations.

To avoid hydrogen loss and recompression expenses in many hydroconversion processes, such as hydrodesulfurization, hydrocracking or hydrotreating, there is no purge at all taken from the hydrogen and hydrogen sulfide containing gas stream that is recycled to the hydrocracker reactor. Instead, the hydrogen sulfide is allowed to buildup to a sufficiently high concentration in the recycle stream so that hydrogen sulfide formed in hydroconversion will be removed with the liquid in the high pressure separator that follows the hydroconversion reactor. Due to the buildup of hydrogen sulfide in the recycled gas, extra energy is expended in recycling and compressing an impurity. In some cases the hydrogen sulfide has a detrimental effect on the hydroconversion catalyst. In all cases, higher hydrogen sulfide concentrations lower the hydrogen partial pressure which, in turn, results in poorer hydrogenation and shortens the catalyst life. Also, the higher hydrogen sulfide concentrations result in increased corrosion rate.

The elimination of the purge postpones the hydrogen sulfide removal problem, as the hydrogen sulfide must then be stripped from the liquid hydrocarbon from the high pressure separator. Thus, the problems of the processes that take a purge from the high pressure recycle hydrogen stream are again present except that hydrogen is not lost from the recycle stream.

The Claus process is a recognized manner of manufacturing sulfur from hydrogen sulfide. The conversion of hydrogen sulfide to elemental sulfur as carried out by the Claus process comprises burning part of the hydrogen sulfide with air to form sulfur dioxide which is treated with the remaining hydrogen sulfide at about 570° F. in the presence of a catalyst to form sulfur. The two stages of the hydrogen sulfide conversion may be represented as $$2H_2S + 3O_2 \rightarrow 2SO_2 + 2H_2O$$
$$SO_2 + 2H_2S \rightarrow 3S + 2H_2O$$

Conversion to sulfur is about 95% based on the hydrogen sulfide.

The total capacity of much improved Claus type sulfur manufacturing plants is at least 80 percent of the world's current production of sulfur from hydrogen sulfide. However, if a hydrogen sulfide and inert gas mixture is fed to a Claus process, the ratio of hydrogen sulfide to inert gas should be at least 1:9 to support combustion. This is a higher concentration of hydrogen sulfide than is present in most refinery hydrogen sulfide containing streams.

There is an increasing need to economically integrate a sulfur recovery process into a hydroconversion process as there is a current shortage of sulfur (Chem. Eng., Aug. 29, 1966, pp. 38, 40). It has now been found that by feeding a purge gas from a hydroconversion zone to a partial oxidation step, many of the disadvantages of the prior art mentioned above are overcome, in addition to which the feed to the Claus process will have a sufficiently high hydrogen sulfide to inert gas (mainly carbon dioxide) ratio to operate the Claus process.

SUMMARY OF THE INVENTION

In accordance with the present invention, a purge stream is taken from a gas stream, containing hydrocarbons, hydrogen, hydrogen sulfide and other gases, that is recycled to a hydroconversion zone. This purge stream is fed to a partial oxidation zone wherein hydrocarbons are partially oxidized to form hydrogen, carbon monoxide and carbon dioxide. Hydrogen sulfide and carbon dioxide are removed from the partial oxidation zone effluent so that the hydrogen and carbon monoxide of the partial oxidation zone effluent may be recycled to the hydroconversion zone. Generally, it will be desired to shift the carbon monoxide with water to form more hydrogen and, after removal of carbon dioxide formed, recycle the pure hydrogen to the hydroconversion zone. The hydrogen sulfide and carbon dioxide stream removed from the partial oxidation zone effluent is fed to a Claus process for the manufacture of sulfur.

Many advantages accrue from this invention. Because of the relatively high volatility of hydrogen sulfide compared to most hydrocarbons, there is sufficient hydrogen sulfide in the purge gas so that the ratio of hydrogen sulfide to carbon dioxide after partial oxidation of the hydrocarbons is sufficiently high (greater than 1:9) for feed to a Claus process for manufacture of sulfur. On the other hand, a typical crude oil containing 1.5 wt. percent sulfur would not have sufficient sulfur to make the $H_2S$–$CO_2$ mix in the effluent from partial oxidation of the crude oil a suitable feed to a Claus process. Purge gas from a hydroconversion recycle gas stream may contain as much as 20 wt. percent sulfur as $H_2S$ when the volume percent $H_2S$ impurity in the recycle gas is 5%. However, a typical purge gas may contain as little as 0.20 vol. percent $H_2S$ and still be suitable feed to a Claus process after partial oxidation and hydrogen plus carbon monoxide removal. This is because the typical purge gas from a hydroconversion zone contains few heavy or high boiling hydrocarbons and approximately only one-tenth of a molecule of $CO_2$ results from each atom of carbon in the hydrocarbons oxidized in the partial oxidation zone. The removal of hydrogen sulfide and other impurities from the hydroconversion recycle hydrogen gas stream by means of withdrawing the purge gas results in an increase in the recycle hydrogen purity. Thus, less energy is expended to compress the hydrogen sulfide impurity and other impurities which would be allowed to build up to substantial concentrations in many of the prior art hydroconversion processes. Also, the hydrogen partial pressure, at any given total pressure, increases, which in turn results in better hydrogenation, improved products and longer catalyst life.

Since the purge from the hydroconversion recycle gas stream lowers the amount of hydrogen sulfide in the recycle and hence also in the purge gas, a balance must be struck to give reasonable recycle gas purity but with the purge still being in the right hydrogen sulfide concentration range for eventual feed to a Claus type process for manufacture of sulfur. The proper balance point will depend on a number of factors, the most important of which is the sulfur content of the hydroconversion zone feed. For example, with residuum feed the sulfur content is higher than with lighter hydrocarbon feeds. Thus, there will generally be a higher purge rate with the residuum feeds than with the lower boiling hydrocarbon feeds.

Because of the higher sulfur content of residuum feeds, they are particularly desirable feedstocks for the hydroconversion zone of the present invention. Not only is there more hydrogen sulfide formed in the hydroconversion of the high sulfur residuum, but also, since a higher temperature is used than for lower boiling oils, there generally are more light gases such as methane and ethane formed in the hydroconversion zone. Thus purging of the high pressure recycle gas is especially beneficial to maintain hydrogen partial pressure when feeding residuum to the hydroconversion zone. Furthermore, the higher temperatures result in increased corrosion danger so that it is especially desirable to reduce the concentration of corrosive constituents such as hydrogen sulfide.

In virtually all hydrocarbon feedstocks there are some nitrogen compounds present. In the hydroconversion zone many of these nitrogen compounds are converted to ammonia and hydrocarbons. To avoid problems with ammonium bisulfide formation the ammonia is washed out of the hydroconversion zone recycle gas with water. In washing out the ammonia an equilibrating amount of hydrogen sulfide is also removed in the ammonia wash water. Therefore, high sulfur-low nitrogen residum is an even more desirable feedstock for the hydroconversion zone of the present invention.

It has been found that the purge from the recycle gas to a hydrocracker has a great effect in lowering the impurities in the recycle stream so that the effect of the purge is to sharply improve the hydrocracker operation. The marked effect that hydrogen partial pressure has on hydrogenation is illustrated by Table 1.

TABLE 1.—EFFECT OF HYDROGEN PRESSURE ON HYDROGENATION OF BENZENE

| Temp., °C. | K (equilibrium constant) | Hydrogen pressure, atm. | $[C_6H_{12}]/[C_6H_6]$ (Ratio of cyclohexane to benzene) |
|---|---|---|---|
| 427 | 5.52×10⁻⁵ | 1 | 5.52×10⁻⁵ |
|  |  | 50 | 6.90 |
|  |  | 100 | 55.2 |
|  |  | 300 | 1,490 |
| 527 | 4.84×10⁻⁷ | 50 | 0.0605 |
|  |  | 100 | 0.484 |
|  |  | 300 | 13.1 |

Table 1 shows that the benzene hydrogenation, as is true of other hydrocarbons, is considerably more complete as the hydrogen partial pressure increases. It is also to be noted from the Table 1 data that it is more important to have high hydrogen purity (and thus high hydrogen partial pressure) at higher temperatures as the equilibrium constant is lower than at the lower temperatures. Since hydrogenation catalyst may be fouled at the latter part of a catalyst run (a catalyst run being the length of time from catalyst installation to catalyst regeneration) it is often necessary to increase the reaction temperature to speed up the reaction kinetics. Thus purging to maintain a high hydrogen purity becomes particularly important at the end of a catalyst run, when reaction temperatures are maintained at higher levels than earlier in the run.

The purge is of particular importance in those hydroconversions operations where the catalyst life is very sensitive to hydrogen purity. For example, in the case of hydroconversion catalysts, the life is a nonlinear function of hydrogen purity, and a decrease by factor of 5% in impurities may increase catalyst life by 50%. Furthermore, the hydrogen sulfide, which tends to concentrate in the gaseous form due to its high volatility, is of sufficient concentration in the purge from the recycle so that it may be fed to a Clause process with the $CO_2$ produced by partial oxidation of the light hydrocarbons, after separation from the hydrogen and carbon monoxide.

Since partial oxidation is used in the invention between a hydroconversion zone and sulfur manufacture, the partial oxidation serves the dual purpose of removing hydrocarbons from the purge stream before sulfur manufautre and of furnishing hydrogen for a hydroconversion zone. When a residuum hydrocarbon is used as feed to the hydroconversion zone, the position of the partial oxidation zone is again of particular advantage, as high boiling, unconverted residuum in the hydroconversion zone effluent may be fed, in addition to purge gas, to the partial oxidation zone for manufacture of hydrogen and hydrogen sulfide.

Another advantage of the invented process combination is that the purge gas can be taken through the partial oxidation zone and the $H_2$ produced returned to hydroconversion wtih little recompression. This is because the partial oxidation zone can operate at high pressure. For example, the hydroconversion zone may be operated at 1500 p.s.i.g. and the partial oxidation zone at 1300 p.s.i.g. After removing hydrogen and carbon monoxide from hydrogen sulfide and carbon dioxide in the partial oxidation zone effluent the hydrogen (generally after carbon monoxide shift conversion and removal of resulting carbon dioxide) may be routed back to the hydroconversion zone with only a slight (about 200 p.s.i.g.) boost in pressure.

Removal of the hydrogen sulfide and carbon dioxide in the partial oxidation zone effluent is economically done at high pressure in the range 500–2000 p.s.i.g. using a physical absorption process. In using physical absorption rather than a chemical reaction absorption process, the high pressure works to the advantage of the absorption step as in physical absorption the gases follow the normal principle of more solubility at higher pressure. Polar solvents such as methanol or acetone are good absorbents to effect the high pressure hydrogen sulfide and carbon dioxide removal step. Chemical reaction absorbents, such as monoethanolamine, are not as advantageous as they generally require greater energy expenditure to regenerate and high pressure levels have little if any beneficial effect on their absorptive ability.

Because of these advantages and other advantages inherent in the invention, the process presents an economical method of manufacturing sulfur from hydrogen sulfide and other sulfur compounds present in the oil fed to a hydroconversion process. The process has advantageous application in any process where it is desirable to withdraw purge gas containing hydrocarbons and hydrogen sulfide.

BRIEF DESCRIPTION OF DRAWINGS

FIGURE 2 is a schematic flow sheet of an embodiment of the invented process as applied to a hydroconversion zone followed by a high pressure separator.

FIGURE 3 is a schematic flow sheet of an embodiment of the invented process as applied to a hydroconversion zone followed by a high pressure separator and a low pressure separator.

DETAILED DESCRIPTION AND DESCRIPTION OF THE PREFERRED EMBODIMENTS

Figure 1:
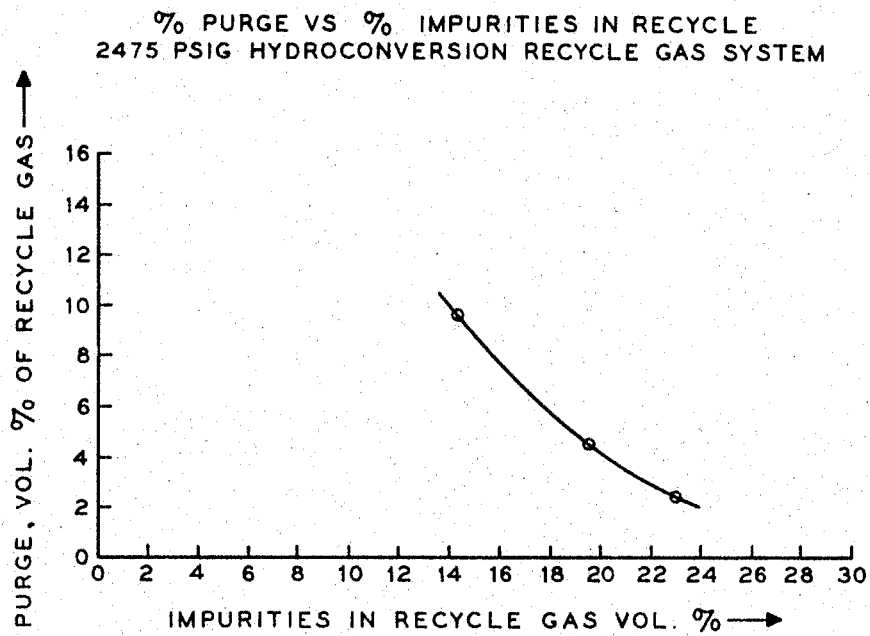
FIGURE 1 is a graph showing the effect of increasing purge rates on recycle hydrogen purity.

FIGURE 1 illustrates the pronounced effect the purge has on reducing impurities. The curve shown in FIGURE 1 was obtained by computer calculations using a computer program of the steps in a hydroconversion process which used a recycle hydrogen rich gas, specfically a hydrotreating process. The equilibrium constants (K values or ratio of mole fraction of a constituent in vapor phase to mole fraction of the constituent in liquid phase to mole fraction of the constituent in liquid phase) used in the equilibrium flash calculations in the computer program have been checked for accuracy in high pressure hydrogen-hydrocarbon systems. Reading from the curve in FIGURE 1 it is seen that at a purge of 2.3 vol. percent of the recycle gas, i.e., 2.3 std. cu. ft./hr. of purge per 100 std. cu. ft./hr. of recycle gas, the impurities in the recycle gas constitute 23 vol. percent of the recycle gas, i.e., 23 std. cu. ft. of $H_2S$, $NH_3$, methane and other hydrocarbons per 100 std. cu. ft. of $H_2$, $H_2S$, $NH_3$, methane and other hydrocarbons. But if the purge rate is increased to 9.5 vol. percent of the recycle gas, the impurities in the recycle gas constitute only 14.5 vol. percent of the recycle gas. In other terms, since the impurities have been decreased by 23−14.5=8.5 vol. percent by increasing the purge rate, the hydrogen purity has increased by 8.5 vol. percent. Thus it can be seen from FIGURE 1 that increasing the purge from the recycle hydrogen-rich gas stream substantially lowers the impurities concentration and raises the hydrogen concentration in the recycle gas.

To facilitate understanding of the invention, a detailed description thereof is presented in the context of FIGURES 2 and 3 of the attached drawings. It will be recognized, however, that the figures are illustrative only of preferred embodiments of the invention, which are not restricted thereto. Since the process units are subject to many variations and alternate modes of operation, all of which are well known, they are shown simply as rectangular boxes.

Referring now to FIGURE 2, oil is passed in line 1 and a gas stream containing hydrogen is passed in line 2 to a hydroconversion zone A. The hydroconversion zone may include any type of hydroconversion process, such as hydrocracking with catalyst, thermal hydrocracking using no catalyst, hydrofining or hydrotreating petroleum with or without a catalyst, thermal or catalytic hydrodealkylation, or hydrogenation of coal or tar or shale oil. One typical hydroconversion process is hydrocracking, which is described above under description of the prior art. U.S. Patent 3,288,703 to Spars and Mason also describes a process to which the invention may be applied, see specifically line 29 in the drawing showing a purge from a hydrogen recycle system and col. 3, lines 37–40.

In FIGURE 2 the hydroconversion zone A effluent is passed through lines 3 and 4 into high pressure separator B. Recycle hydrogen is withdrawn from the high pressure separator through line line 5 and recycled to the hydroconversion zone A in line 6. Purge gas is withdrawn through line 7 and passed to partial oxidation zone C, where it is partially oxidized using oxygen introduced in line 12.

Raw synthesis gas is the term applied to a mixture of hydrogen and carbon monoxide which may be obtained by partial oxidation of hydrocarbons as in partial oxidation zone C. The ratio of hydrogen to carbon monoxide varies with the particular process of partial oxidation. The essential reaction involves the combustion of a fuel in an inadequate supply of oxygen which is provided, for example, by an air liquefaction plant. Steam may be admixed with the oxygen. It may be advantageous to operate under pressure in order to save the cost of compression of the synthesis gas even though the pressure has an adverse effect on the equilibrium of the major reaction involved:

$$CH_4 + \tfrac{1}{2}O_2 \rightarrow CO + 2H_2$$

Broadly, there are two types of synthesis gas processes—catalytic and noncatalytic. Gradually processes have developed where the process heat is supplied in situ by partial combustion of a portion of the feed. In European operations common practice has been to supply a steam-oxygen mixture together with methane from coal gas or other sources to a chamber containing a supported nickel catalyst. The ONIA–GEGI is such a process which has been widely applied in Europe. Most United States process development has concentrated on the direct noncatalytic route for reaction of oxygen with natural gas, naphtha or fuel oil to produce synthesis gas. The cost of installation, care and replacement of catalyst is avoided and, perhaps most importantly, a continuous process is provided which can flexibly handle feeds ranging from natural gas to heavy fuel oils.

The partial oxidation process is not restricted to natural gas as a raw material but can also be applied to other raw materials which cannot readily be reformed with steam either because they would choke the catalyst or would poison it with sulfur compounds. The reaction in the case of fuel oil may be expressed as follows:

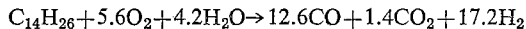

$$C_{14}H_{26} + 5.6O_2 + 4.2H_2O \rightarrow 12.6CO + 1.4CO_2 + 17.2H_2$$

Operating conditions include temperatures up to 3,200° F., usually 2,000–2,800° F., at pressures up to 10,000 p.s.i.g. Usually, heretofore, pressures below 600 p.s.i.g. have been used; but in the present invention it is advantageous to use pressures similar to those used in the hydroconversion zone; e.g., of 500–4,500 p.s.i.g. Various specific partial oxidation processes are commercially available, such as the Shell Gasification process, the Fauser-Montecatini process and the Texaco-Hydrocarbon Research process.

Liquid from the high pressure separator B in FIGURE 2 is withdrawn through line 8 and typically passed in line 10 to further processing not shown, for example, fractionation or further hydroconversion. However, a portion of this liquid may be passed through line 9 to the partial oxidation zone C. Any desired supplemental feed to the partial oxidation zone C is fed to the partial oxidation zone through line 25. In this respect, normally low value, high sulfur residua may be advantageously used as a supplemental feed to the partial oxidation zone to generate valuable hydrogen and hydrogen sulfide. Effluent from the partial oxidation zone C is withdrawn in line 13 to carbon removal zone D where carbon is removed by water wash introduced in line 11. The effluent gas from the carbon removal zone D is passed through lines 14 and 15 to hydrogen sulfide and carbon dioxide removal zone E, where hydrogen sulfide and carbon dioxide are removed from the other gases, typically by the absorption in polar solvent, such as methanol or acetone. The absorbent used for hydrogen sulfide and carbon dioxide removal is passed via line 16 to absorbent regeneration zone F for regeneration. The hydrogen sulfide and carbon dioxide liberated by the regeneration is passed in line 17 to a Claus process shown as zone I for manufacture of sulfur. Air or oxygen is introduced to zone I via line 18. Carbon dioxide is removed via line 20 and product sulfur via line 19.

Fundamentally the Claus process (sometimes also referred to as the Claus-Chance process) involves burning ⅓ of the hydrogen sulfide to form sulfur dioxide. The sulfur dioxide is reacted with the unburned $H_2S$ in the presence of surface-active catalyst such as bauxite at about 600° F. to form sulfur and water vapor. The sulfur is condensed to the liquid form and pumped to storage or to tank cars for shipment or to storage space where it is allowed to solidify. It is thereafter handled as a solid. In these fundamental operations there are several variations in practice:

(1) Combustion of $H_2S$—This operation may be carried out by either passing all of the $H_2S$ into the combustion chamber with the calculated amount of air to oxidize ⅓ of the $H_2S$ or by splitting the $H_2S$ stream before it enters the combustion chamber. In some cases the hydrogen sulfiide is accompanied by inert gases resulting in design difficulties. Inert gases may be present to such an extent that the gas stream will not support combustion. In some cases this problem can be handled by expensive absorption and desorption techniques. In this way the $H_2S$ concentration is increased sufficiently to support combustion.

(2) Reaction of hydrogen sulfide and sulfur dioxide—This operation is fairly uniform in the various plants. Although several catalysts of sufficient surface activity can be used, activated bauxite is the most common as it is durable and inexpensive.

(3) Condensation of sulfur vapors—This operation is carried out by several methods. The sulfur can be condensed by waste heat boiler type condensers, by air cooled condensers or by contacting with molten sulfur in a packed tower. The stream of molten sulfur must be cooled in this operation and this may be done in conventional shell and tube coolers or submerged coils.

Referring again to FIGURE 2, hydrogen and carbon monoxide, left after hydrogen sulfide and carbon dioxide removal zone E, may be directly recycled to the hydroconversion zone through lines 24 and 2, but more typically the carbon monoxide and hydrogen are passed through line 21 to carbon monoxide shift conversion zone G, where the carbon monoxide is shifted with steam to yield more hydrogen. The hydrogen and carbon dioxide resulting from the carbon monoxide shift conversion are passed in line 22 to carbon dioxide removal zone H. The high purity hydrogen stream is recycled to the hydroconversion zone through line 2. Any additional makeup hydrogen that might be needed is added through line 23.

Referring now to FIGURE 3, in contrast to the high pressure separator following the hydroconversion zone in FIGURE 2, the hydroconversion zone in FIGURE 3 is followed in series by a hot high pressure separator K, a high pressure separator B and a low pressure separator J. Effluent from hydroconversion zone A is passed in line 3 to hot high pressure separator K. Some high boiling oils are withdrawn from hot high pressure separator K through line 31 but most of the material introduced into this separator is withdrawn in line 4 and, after cooling, is passed in line 30 to high pressure separator B. Hydrogen-rich recycle gas is withdrawn from high pressure separator B in line 5 and liquid is withdrawn from high pressure separator B in line 32 and passed, after cooling, through line 33 to low pressure separator J. Alternatively, liquid from high pressure separator B may be withdrawn in line 8 and passed to partial oxidation via lines 29 and 9 or to further processing via line 10.

Using the separator sequence shown in FIGURE 3, a heavy high boiling fraction which is of a higher sulfur content than the lower boiling constituents of the effluent from the hydroconversion zone A may be withdrawn in line 31 from hot high pressure separator K. Other streams shown coming from the separators to the partial oxidation zone C may also be used to increase the hydrogen sulfide to carbon dioxide ratio in the partial oxidation zone effluent.

For example, if the oil being fed via line 25 to partial oxidation zone C has a sulfur content of 1% by weight then, in order to support combustion in the Claus process zone I, it will be mandatory that other feed containing a greater concentration of sulfur be fed to partial oxidation zone I. Specifically, if the only hydrocarbon stream being fed to partial oxidation zone C is a residuum containing 1% sulfur, the dry gas effluent from the partial oxidation zone has the following typical volume percent composition: $H_2S$, 0.24; $CO_2$, 4.15; $H_2$, 41.60; CO, 52.01; $CH_4$, 0.98; COS, 0.02; $N_2$, 0.51; A, 0.49. Thus the ratio of hydrogen sulfide to carbon dioxide is 1:17.3 which is less than the 1:9 ratio required to support combustion in the Claus process. The ratio of hydrogen sulfide to carbon dioxide in the effluent from the partial oxidation zone may be increased by feeding, for example, purged gas containing a high weight percent hydrogen sulfide from high pressure separator B shown in FIGURE 3. To reach the minimum 1:9 hydrogen sulfide to carbon dioxide ratio necessary to support combustion in the Claus process, it would be necessary to add 35 s.c.f. of pure hydrogen sulfide per barrel of oil fed to partial oxidation zone C if the oil feed is 1 wt. percent sulfur. Because the purged gas is not pure hydrogen sulfide, more than 35 s.c.f. of purged gas per barrel of 1 wt. percent sulfur oil feed to partial oxidation, is required. Using purged gas from high pressure separator B typically containing 3 volume percent hydrogen sulfide, 1250 s.c.f. of purged gas is required per barrel of 1 wt. percent sulfur oil fed to the partial oxidation step in order to reach the minimum $H_2S$ to $CO_2$ ratio of 1:9 required to support combustion in the Claus process zone I. The 1250 s.c.f. of purged gas per barrel of 1 wt. percent sulfur oil fed to partial oxidation zone C is equivalent to 13.2 pounds of purged gas from high pressure separator B at a molecular weight of 4 per barrel of 1% sulfur oil at a specific gravity of 0.847.

Other high sulfur content streams in FIGURE 3 may also be used in place of, or in conjunction with, the purged gas from the high pressure separator B to raise the hydrogen sulfide to carbon dioxide ratio obtained when feeding relatively low sulfur oil in line 25 to partial oxidation zone C. Purged gas in line 26 from low pressure separator J and oil from any of the separators (lines 31, 8 and 28) may be used as feed to partial oxidation zone C. The high boiling oil in hot high pressure separator K is generally the highest in sulfur content and therefore the most preferred of the separator oil feeds to partial oxidation zone C from the standpoint of sulfur production. However, purged gas generally is the best means of increasing the hydrogen sulfide to carbon dioxide ratio in the patrial oxidation zone effluent largely because there is not as much carbon dioxide formed in the partial oxidation of purged gas as in the partial oxidation of oil feed streams. In particular, the purged gas stream from high pressure separator B generally is preferred to the purged gas stream from low pressure separator J because the former generally contains a higher hydrogen sulfide concentration and less hydrocarbons, which hydrocarbons are partially oxidized to carbon dioxide. Therefore, low pressure separator J gases are generally vented out line 27 to further processing not shown, for example, gas recovery.

But if the pressure in high pressure separator B is particularly high, for example in excess of 1700 p.s.i.g., a great deal of the hydrogen sulfide will be forced into the liquid in high pressure separator B which hydrogen sulfide will largely be liberated into the gas phase in low pressure separator J. Under these circumstances, it is more desirable to pass the low pressure separator J gas to patrial oxidation zone C, with resulting hydrogen production and sulfur production after the Claus process zone I. All of the liquid from high pressure separator B is generally passed to low pressure separator J via lines 32 and 33 unless particularly high pressure, for example, in excess of 1700 ps.i.g., in high pressure separator B makes it more economical to route part of high pressure separator liquid to partial oxidation zone C via lines 8, 29 and 9. Liquid from low pressure separator J is generally the bulk of the product from the hydroconversion zone A and therefore generally will be routed through lines 28, 29 and 10 to further processing, for example, fractionation or further hydroconversion.

The remainder of the processing scheme in FIGURE 3 is much the same as in FIGURE 2. Corresponding numbers have been used in FIGURES 2 and 3 so that the similar features may be more readily seen.

In both FIGURES 2 and 3, the carbon monoxide shift conversion is shown after hydrogen sulfide and carbon dioxide removal from the partial oxidation zone effluent. However, it may be found more desirable to shift convert the carbon monoxide in the partial oxidation zone effluent to hydrogen and carbon dioxide before hydrogen sulfide and carbon dioxide removal. This would be particularly true, for example, when feeding a high sulfur content residuum to the hydroconversion zone as then there is a relatively high hydrogen sulfide concentration in the purge gas. With the higher hydrogen sulfide concentration there would still be a sufficiently high hydrogen sulfide to inert gas (mainly carbon dioxide) ratio to support combustion in the Claus type sulfur manufacturing process, even with the additional carbon dioxide formed from shift conversion of the carbon monoxide.

It is to be understood that the forms of the invention herein shown and described are to be taken only as preferred embodiments. Various changes may be made in the basic process, such as the manner of routing the liquid from the high pressure or low pressure separator, the manner of removing carbon from the partial oxidation effluent, the manner of removing hydrogen sulfide and carbon dioxide from the partial oxidation zone effluent. Feed (line 25) to the partial oxidation zone is described herein as being an oil but it may be any hydrocarbon. Also, the manner of purifying the hydrogen and carbon monoxide stream after hydrogen sulfide and carbon dioxide removal may be altered, such as by the use of methanation of carbon monoxide rather than, or in addition to, shift conversion. The invention may be advantageously applied in different embodiments than shown, where it is desirable to withdraw purge gas containing light hydrocarbons and sulfur compounds. Hydrogen formed by the partial oxidation of the hydrocarbons need not necessarily be used in a step of the process from which the purge gas is withdrawn in order to make the invention economically attractive.

We claim:
1. A process for producing sulfur and hydrogen from a hydroconversion zone recycle gas containing hydrocarbons, hydrogen and hydrogen sulfide which comprises:
   (1) withdrawing purge gas from said recycle gas;
   (2) partially oxidizing said purge gas in a partial oxidation zone to form hydrogen, carbon monoxide and carbon dioxide;
   (3) withdrawing as effluent from the partial oxidation zone a stream comprised of hydrogen sulfide and said hydrogen, carbon monoxide and carbon dioxide formed in the partial oxidation zone;
   (4) separating hydrogen sulfide and carbon dioxide from said effluent from the partial oxidation zone to obtain a hydrogen stream of lower $H_2S$ volume percent concentration than said purge gas and a hydrogen sulfide-carbon dioxide stream; and
   (5) passing said hydrogen sulfide-carbon dioxide stream to a zone for manufacture of sulfur.

2. A process in accordance with claim 1 wherein a liquid oil portion of the hydroconversion zone effluent is also fed to the partial oxidation zone.

3. A process in accordance with claim 1 wherein said effluent from the partial oxidation zone is passed to carbon monoxide shift conversion, after which the hydrogen sulfide and carbon dioxide are separated from the shift conversion effluent and passed to a zone for manufacture of sulfur.

4. A process in accordance with claim 2 wherein a residuum oil is fed to the hydroconversion zone.

5. A process wherein oil is passed with hydrogen at elevated temperature and pressure to a hydroconversion zone, the effluent of said hydroconversion zone, containing at least hydrocarbons, hydrogen and hydrogen sulfide, is passed at least in part to a high pressure separator, and a hydrogen, hydrocarbon and hydrogen sulfide containing gas is recycled from said high pressure separator to the hydroconversion zone, and sulfur and hydrogen are produced by a combination of steps which comprises:
   (1) withdrawing a purge gas stream from the recycle stream containing sufficient hydrogen sulfide for at least a 1:9 hydrogen sulfide to carbon dioxide ratio (by volume) after partial oxidation of said purge gas stream;
   (2) partially oxidizing said purge gas in a partial oxidation zone to form hydrogen, carbon monoxide and carbon dioxide;
   (3) withdrawing as effluent from the partial oxidation zone a stream comprised of hydrogen sulfide and said hydrogen, carbon monoxide and carbon dioxide formed in the partial oxidation zone;
   (4) separating hydrogen sulfide and carbon dioxide from said effluent from the partial oxidation zone as in step 4 of claim 1;

(5) passing said hydrogen sulfide- carbon dioxide stream separated from said effluent from the partial oxidation zone to a zone for manufacture of sulfur.

6. A process in accordance with claim 5 wherein:
(1) hydrogen and carbon monoxide formed in said partial oxidation zone are passed to hydrogen purification to obtain purified hydrogen, and
(2) the purified hydrogen is passed to the hydroconversion zone.

7. A process in accordance with claim 5 wherein purge gas is also withdrawn from a low pressure separator connected in series with said high pressure separator.

8. A process in accordance with claim 5 wherein:
(1) the hydroconversion zone effluent is passed to a hot high pressure separator;
(2) a highest boiling portion of the hydroconversion zone effluent is passed from the hot high pressure separator to the partial oxidation zone; and
(3) vapor from the hot high pressure separator is passed to said high pressure separator.

9. A process in accordance with claim 8 wherein a residuum oil is fed to the hydroconversion zone.

10. A process in accordance with claim 1 wherein in the zone for manufacture of sulfur, sulfur is produced by a Claus type process.

11. A process in accordance with claim 5 wherein in the zone for manufacture of sulfur, sulfur is produced by a Claus type process.

References Cited

UNITED STATES PATENTS

| 2,994,588 | 8/1961 | Eickmeyer | 23—225 |
| 3,099,536 | 7/1963 | Urban | 23—225 |
| 3,266,866 | 8/1966 | Bally et al. | 23—2 |
| 3,331,770 | 7/1967 | Cockerham | 208—212 |
| 3,356,608 | 12/1967 | Franklin | 208—212 |
| 3,359,198 | 12/1967 | Lengemann | 208—111 |
| 3,388,971 | 6/1968 | Schuman | 23—224 |

OTHER REFERENCES

Girdler Corp., Petroleum Refiner; vol. 43, No. 9 September 1964, pp. 230–31.

OSCAR R. VERTIZ, Primary Examiner

G. O. PETERS, Assistant Examiner

U.S. Cl. X.R.

208—212